United States Patent

[11] 3,622,874

| | | |
|---|---|---|
| [72] | Inventor | Norman E. Chasek<br>Stamford, Conn. |
| [21] | Appl. No. | 2,827 |
| [22] | Filed | Jan. 14, 1970 |
| [45] | Patented | Nov. 23, 1971 |
| [73] | Assignee | International Microwave Corporation<br>Cos Cob, Conn. |

[54] SYSTEM FOR MEASURING THE THICKNESS OF SHEET MATERIAL INCLUDED IN AN RF ENERGY LOOP PATH
19 Claims, 5 Drawing Figs.

[52] U.S. Cl. ........................................... 324/58.5 A,
330/56, 330/61, 331/132
[51] Int. Cl. ........................................... G01n 27/04
[50] Field of Search.......................................... 324/57,
58.5 A; 330/4, 56, 61 A; 331/59, 132

[56] References Cited
UNITED STATES PATENTS
3,484,711  12/1969  Easter ........................ 330/61
3,490,037  1/1970  Williams ...................... 324/58.5 B

*Primary Examiner*—Edward E. Kubasiewicz
*Attorneys*—Blair Cesari and St. Onge

ABSTRACT: Sheet material is passed between microwave antennas connected in a transmission line loop which includes a negative resistance amplifier. RF energy reflected from opposing surfaces of a metal sheet or transmitted through a dielectric sheet is amplified by the amplifier to produce oscillatory operation. The frequency of oscillation is dependent upon the electrical length of the loop, and thus the thickness of the sheet.

INVENTOR.
Norman E. Chasek
BY
Blair, Cesari & St. Onge
ATTORNEYS.

INVENTOR.
Norman E. Chasek
BY
Blair, Cesari & St. Onge
ATTORNEYS.

3,622,874

SYSTEM FOR MEASURING THE THICKNESS OF SHEET MATERIAL INCLUDED IN AN RF ENERGY LOOP PATH

BACKGROUND OF THE INVENTION

The measurement of dimensions of objects while in motion presents numerous problems, particularly if considerable accuracy is required. The measuring technique employed must have rapid response as, in many instances, the object or series of objects move with relatively high velocities. If the the measuring instrument requires physical contact with the object, the resulting relative movement therebetween causes friction and wear, which detracts from the accuracy of the readings unless the instrument is recalibrated at frequent intervals, assuming it can be recalibrated. This is time consuming and, in some applications, may require production shutdowns where the object or objects are to be measured upon leaving production or processing equipment.

Moreover, in order to obtain accurate measurements the object or objects may have to be precisely positioned relative to a predetermined reference point or plane while a measurement is taken. Consequently, the handling equipment for the measured object must be of high quality and may be expensive to construct and/or operate.

In some quality control applications, such as in the manufacture of metal sheets and slabs, thickness measurements should be performed continuously, thus making the above problems even more difficult to solve. Then too, the sheets may have to be measured while at extremely high temperatures, particularly where the thickness dimension is monitored for use in controlling production machinery, such as rolling mills.

SUMMARY OF THE INVENTION

According to my invention, I utilize microwave systems to overcome the problems of prior art dimensional measuring instruments and systems. While my invention has particular application to obtaining thickness measurements of moving sheets or slabs emanating from production equipment, other applications are contemplated. The characteristic measured or monitored need not be an object's thickness and the object itself may be in forms other than sheeting.

In the application of my invention to measuring or monitoring the thickness of sheet material, a transmitting antenna beams RF energy against one surface of the sheet. This surface impinging energy is intercepted by a receiving antenna which may be the transmitting antenna itself. The transmitted and received RF energy is coupled in a loop path which includes a microwave amplifier. Conditions for oscillation are established; the frequency of oscillation depending on the electrical length of the loop path. The loop path electrical length is, in turn, dependent on the thickness of the sheet.

In the case of metallic sheets, the surface impinging energy is reflected and intercepted by the receiving antenna. By referencing the position of the opposite surface of the sheet, the spacing between the antennas and the sheet surface, which spacing is traversed by the energy and thus is included in the loop path to constitute a portion of its electrical length, varies with changes in sheet thickness.

For a plastic or dielectric sheet, which is radiotransparent, the surface impinging energy passes through the sheet and is intercepted by a receiving antenna stationed on the opposite side of the sheet from the transmitting antenna. The velocity of the energy decreases for the interval of its passage through the sheet. Since the electrical length also depends on the velocity of the energy, variations in sheet thickness will produce changes in the electrical length of the energy loop path.

A portion of the energy recirculating in the loop is coupled to an FM superheterodyne receiver including a balanced discriminator. A change in the frequency of the energy in the loop, occasioned by a change in sheet thickness, is detected in the discriminator and manifested by a corresponding change in the DC output voltage of the discriminator. Changes in the discriminator output occur substantially instantaneously with changes in the thickness dimension of the sheet passing between the antennas. Thus, the system of my invention has a negligible response time and can easily measure sheets moving at high velocities.

In order to provide for a high degree of accuracy and resolution, the frequency of oscillatory operation is established in the super high frequency range, e.g., 9,000 megacycles (mc.). Consequently, small changes in the thickness dimension nevertheless represent a significant fraction of a wavelength. Moreover, by virtue of operation in a high-frequency range, the components of the system are necessarily of small physical size.

Further in accordance with my invention, I also include a phase filter in the loop. The phase filter serves to prevent oscillation at frequencies outside the desired frequency range or band and also establishes a desired relationship between the frequency shift and changes in the sheet thickness.

My invention accordingly comprises the features of construction, combination of elements, and arrangement of parts which will be exemplified in the construction hereinafter set forth, and the scope of the invention will be indicated in the claim.

For a fuller understanding of the nature of the invention, reference should be had to the following detailed description taken in conjunction with the accompanying drawings in which.

Similar reference numerals refer to corresponding parts throughout the several views of the drawings.

DETAILED DESCRIPTION OF THE INVENTION

Figure 1:
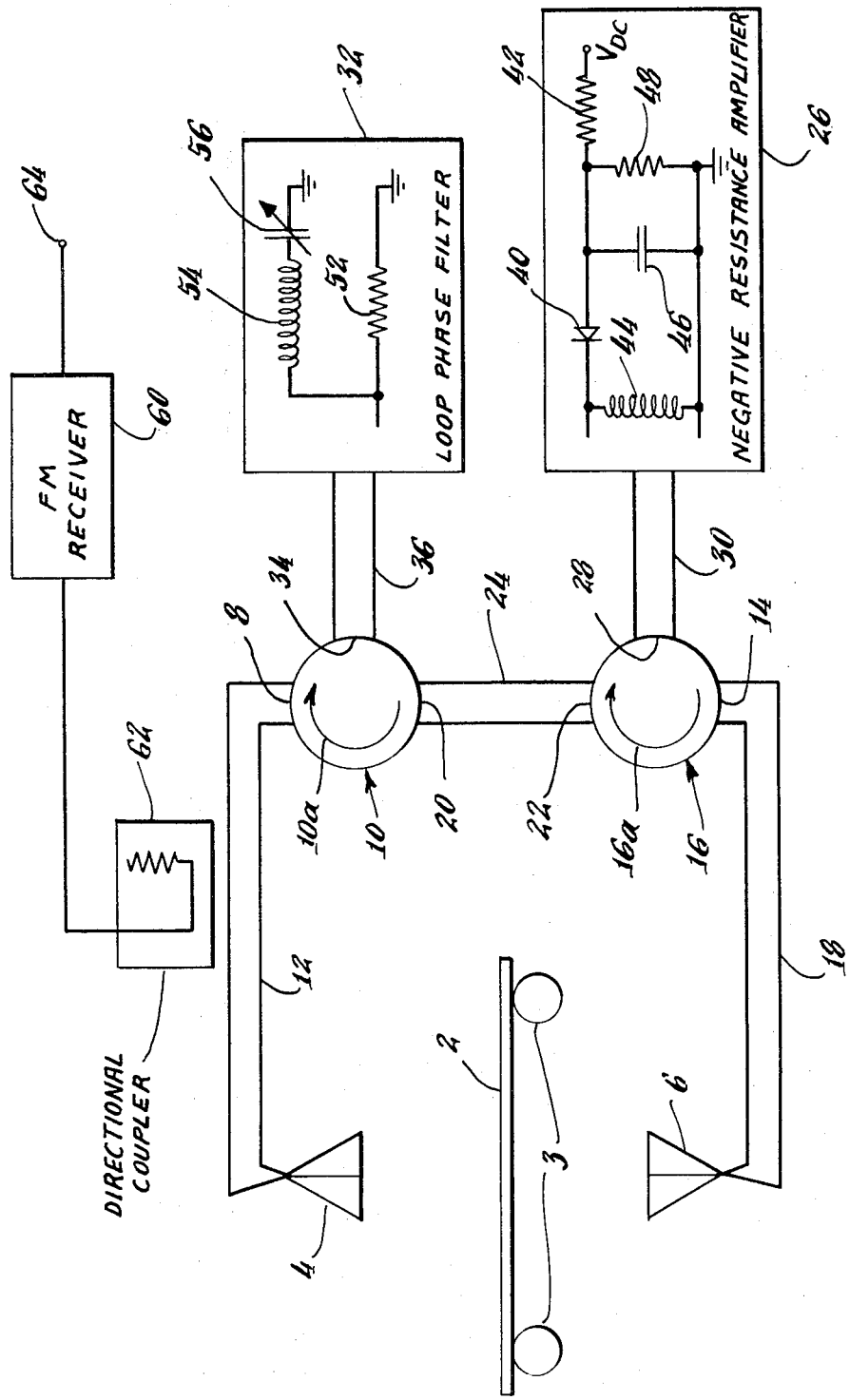
FIG. 1 is a block circuit diagram of one embodiment of my invention applicable for use in monitoring the thickness of metallic, as well as dielectric sheet materials.

Referring to FIG. 1, a sheet 2 is passed by conveyor means 3 between a pair of microwave horn antennas 4 and 6. While the antennas are shown spaced substantially equidistant from opposite surfaces of the sheet 2, this need not be the case, as will become apparent. Antenna 4 is coupled to a port 8 of a circulator 10 by a transmission line 12. Similarly, antenna 6 is coupled to a port 14 of a circulator 16 by a transmission line 18. The circulators are conventional, while the transmission lines may be coax or waveguide, but preferable waveguide because of the high-frequency energy propagating therethrough. The transmission lines are preferably invar because of its very low thermal coefficient of expansion. As will be seen, the dimensions of the transmission lines must remain substantially constant despite varying temperature conditions, so temperature stability is an important and necessary consideration. Moreover, the antennas must be mounted and positioned so that the distance therebetween cannot vary with vibrations and other external disturbances.

Returning to the FIG. 1, a port 20 of circulator 10 is coupled to a port 22 of circulator 16 by a transmission line 24. Thus, the antennas are connected in a loop path consisting of transmission lines 12, 18 and 24 and circulators 10, 16. Also included in this loop are a negative resistance amplifier 26 coupled to port 28 of circulator 16 by a transmission line 30 and a loop phase filter 32 coupled to port 34 of circulator 10 by a transmission line 35.

The amplifier 26 is shown in its equivalent circuit form in the drawing and preferably includes a tunnel diode 40 as the active element. The tunnel diode 40 is incorporated in the other end of transmission line 30 from port 28 to serve as the electrical termination thereof. A DC voltage $V_{DC}$ is applied to the tunnel diode 40 through a dropping resistor 42 to bias the diode into its negative resistance operating region. With the transmission line 30 effectively terminated in a negative resistance, the magnitude of the energy reflected at the termination is greater than the magnitude of the incident energy, thus producing amplification.

Still considering the amplifier 26, inductance 44 is used to tune out the internal capacity of the tunnel diode 40. Capacitance 46 is a bypass while resistance 48 is a stabilizing resistor.

It will be understood that although amplifier 26 employs a tunnel diode in the illustrated embodiment, other negative resistance devices, such as avalanche or Gunn diodes, may also be used. Transistor circuitry can also be designed to exhibit a negative resistance characteristic, and thus may be used in my invention. Tunnel diode amplifiers are preferred because of their inherently minimal amplitude versus phase distortion characteristics.

While the loop phase filter 32 may take a variety of structural forms, I prefer to use the form having the equivalent circuit shown in the drawing. Thus, the transmission line 36 is terminated in its characteristic impedance represented by resistance 52. Ahead of this termination, the line is shunted to ground through a series LC network consisting of inductance 54 and capacitance 56. In practice, this LC network can be created by the introduction of a quarter wave open circuit stub into the transmission line 36. The capacitance 56 introduced by the stub may be made effectively variable by tuning a grounded slug or screw against the outer end of the stub. The spacing between the screw and the stub outer end is varied to establish the desired center operating frequency.

It will be seen that for energy of a frequency at which the LC network is series resonant the transmission line 36 is shorted out ahead of the resistive termination 52 and such energy is reflected back to port 34 of circulator 10 with virtually no loss. On the other hand, as the frequency of the energy moves away from this center frequency, less energy is reflected since the LC network no longer shorts the transmission line 36. The unreflected energy is absorbed by the resistive termination 52.

Considering the operation of the embodiment of FIG. 1 for the situation where sheet 2 is metallic, antenna 4 radiates the energy received over transmission line 12 toward the upper surface of sheet 2. The energy is reflected therefrom, and returns to antenna 4 from which it propagates along transmission line 12 to port 8 of the circulator 10. Energy is coupled between adjacent ports of the circulator 10 in the direction indicated by arrow 10a. Thus, the energy received at port 8 of circulator 10 is coupled to port 34. Assuming that the inductance 54 and capacitance 56 of loop phase filter 32 are tuned to the frequency of the energy propagating along transmission line 36 from circulator 34, this transmission line is short circuited in advance of the resistive termination 52 and total energy reflection is achieved. The reflected energy returns to port 34 and is coupled to port 20 and then to port 22 of circulator 16 by way of transmission line 24.

Circulator 16 couples energy in the direction indicated by arrow 16a, and thus port 22 is coupled to port 28. Transmission line 30 conveys the energy to the negative resistance amplifier 26, which amplifies the energy and returns it to port 28 of the circulator 16. The circulator 16 routes this energy from port 28 to port 14, from which it propagates along transmission line 18 to the antenna 6. The energy is beamed against the undersurface of sheet 2, reflected and returned to antenna 6. It is now seen that this reflected energy passes through transmission line 18 in the opposite direction to port 14 from which it is coupled to port 22 of the circulator 16. Transmission line 24 conveys the energy to port 20 of circulator 10 which operates to couple it to port 8. The energy then passes along transmission line 12 to antenna 4 thus completing the recirculating path.

At this point it should be noted that the coupling direction of circulators 10 and 16, indicated by arrows 10a and 16a, respectively, is purely arbitrary, and may be reversed from the directions shown in the drawings. That is, an energy loop path is established regardless of the directions in which the circulators 10 and 16 circulate the energy between their ports.

Operating conditions are established such that at any reference point in the loop, the phase of the energy in one direction is equal to the phase of the energy propagating in the opposite direction and that the maximum gain of the amplifier 26 exceeds the total loop path losses by a comfortable margin. When these conditions are met, oscillatory operation is achieved. The frequency of oscillatory operation is dependent upon the electrical length of this loop path. It is seen that included in this loop path is the round trip distance between each antenna and the confronting surfaces of the sheet 2. Thus, changes in the thickness dimension of the sheet 2 result in a corresponding change in the electrical length of the loop path. It is to be noted, however, that changes in the position of the sheet 2 relative to the antennas 4 and 6 do not affect the loop electrical length. In fact, the sheet 2 may be somewhat tilted such that the plane of its surfaces are no longer normal to the beam axis of antennas 4 and 6. The antennas function as averaging devices, resolving the varying phases of the returned energy into a single phase corresponding to the mean electrical length of the round trip path between the antenna and the confronting surface of the sheet 2. However, inaccuracies may occur if the sheet 2 was bent so that its surfaces do not lie in respective common planes.

When changes in the thickness dimension of the sheet occur, the electrical length of the loop path changes correspondingly, and the zero phase relationship between the energy to opposite directions at any point in the loop no longer obtains. The frequency of oscillation automatically shifts in order to reestablish this zero phase relationship. The amount of the frequency shift is thus proportional to the variation in the thickness of the sheet 2.

In order to detect these frequency shifts, a portion of the energy in transmission line 12 is coupled to an FM superheterodyne receiver 60 by a directional coupler 62 of known construction. The receiver 60 includes an extremely frequency stable local oscillator for converting the RF energy coupled from the transmission line 12 to a suitable IF frequency in the 30 to 60 megacycle range, for example. A balance discriminator included in the FM receiver 60 converts the IF frequency signal to a DC voltage appearing at output terminal 64. Depending upon the calibration of the system, the DC voltage at output terminal 64 can represent the thickness of the sheet 2 as measured by the system or the degree of deviation of the measured sheet thickness from a standard thickness. This DC voltage may be used in a servo loop to control the equipment forming the sheet 2 so as to maintain constant thickness.

While from a theoretical standpoint, the loop phase filter 32 is not a necessary component in the disclosed system, in practice, it performs two important functions.

First, by adjustment of the parameters of inductance 54 and capacitance 56, a relatively narrow frequency passband may be established to define the frequency band in which the system can oscillate. This is particularly important from a practical standpoint, since the transmission line and the tunnel diode amplifier are extremely broadband devices, accommodating frequencies spread over a wide frequency spectrum. The loop phase filter 32, however, insures that the frequency of oscillation remains within a desired frequency band, centered for example at 9,000 megacycles. Typically, the center frequency of oscillation is selected as that frequency at which the system oscillates in response to a standard thickness of sheet 2. This condition is established in the first instance by adjustment of loop phase filter 32 while a standard thickness sheet is positioned between antennas 4 and 6.

The loop phase filter 32 also determines the magnitude of frequency shift required to reestablish the requisite zero phase relationship after a change in loop electrical length. At the center frequency to which inductance 54 and capacitance 56 are series resonant, the phase of the incident energy and the reflected energy is equal. As the sheet thickness varies, producing a corresponding variation in the electrical length of the loop, the frequency of oscillation shifts in an effort to reestablish the requisite zero phase relationship. The LC network (inductance 54 and capacitance 56) in loop phase filter 32 is then no longer a perfect short for the energy propagating in transmission line 36. A minor portion of the energy is not reflected back to the port 34 of circulator 10 and is absorbed in the resistive termination 52. For the energy that is reflected, however, the loop phase filter 32 introduces a phase shift, in that the phase of the incident energy is no longer equal to the phase of the reflected energy. The extent of this phase shift may be determined experimentally or mathematically for any given variation in loop electrical length.

Thus, the shift in frequency to again establish the requisite condition for oscillation of zero phase relationship must be such as to resolve not only the change in loop electrical length attributed to a change in sheet thickness, but also the phase shift introduced by the loop phase filter. Since the phase shift introduced by the loop phase filter is dependent on the loop electrical length and the amount of frequency shift is dependent on the phase shift, the loop phase filter, in effect, determines the magnitude of frequency shift versus changes in sheet thickness. The loop phase filter is preadjusted to establish a desired phase shift (sheet thickness change) versus frequency operating curve and thus it constitutes the principle calibrating component of the system. The slope of this phase shift versus frequency curve, in effect, determines the thickness resolution capabilities of the system.

This relationship can be expressed algebraically as follows:

$$\Delta d = \Delta f \cdot \lambda / 360° \cdot \Phi_{pf}$$

where $\Delta d$ = sheet thickness deviation in inches $\Delta f$ = frequency shift, in megacycles, $\lambda$ = wavelength in inches at center frequency and $\Phi_{pf}$ = degrees shift per megacycle The embodiment of FIG. 1 is also applicable to monitoring or measuring the thickness of dielectric or plastic sheets which are transparent to RF energy. In this application, RF energy is not reflected from the surfaces of the sheet 2, but rather passes through the sheet. In passing through the sheet, the velocity of the energy is decreased by an amount dependent upon the particular material of the sheet and its thickness. Assuming antenna 6 FIG. 1 to operate as a transmitting antenna, RF energy is beamed against the undersurface of sheet 2, passes through the sheet and is received by antenna 4. The received energy is returned to transmitting antenna 6 through loop phase filter 32 and negative resistance amplifier 26. The filter 32 and amplifier 26 operate in the manner described. As long as the loop gain exceeds unity and the effective phase shift around the loop is zero, oscillatory operation of the loop is obtained. It is to be noted however that, unlike the embodiment of FIG. 1 applicable to metallic sheets, propagation of energy around the loop is in one direction only.

As previously noted, RF energy in passing through dielectric sheet 2 experiences a decrease in velocity. This has the same effect as increasing the distance between transmitting antenna 6 and receiving antenna 4, in the sense that it increases the effective electrical length of the spacing therebetween. However with antennas 4 and 6 fixedly position, variations in the electrical length of that portion of the loop path are in direct relation to variations in the thickness of dielectric sheets. As is the case of the embodiment of FIG. 1 adapted to metallic sheets, variations in the effective electrical length of the loop path result in corresponding changes in the oscillatory frequency of the RF energy circulating therein. By monitoring the frequency of the loop energy using FM receiver 60, a DC output is developed at output 64 whose amplitude is indicative of the thickness of a sheet 2 of dielectric material.

Figure 2:
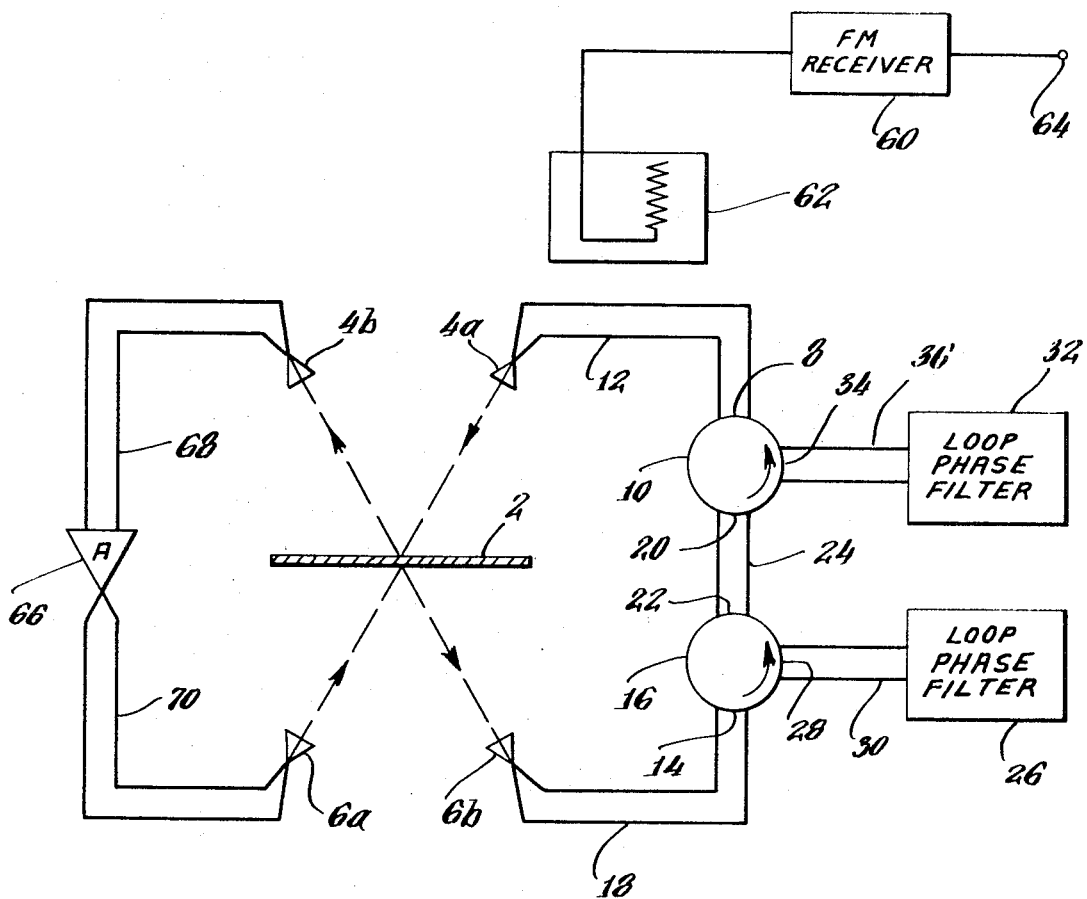
FIG. 2 is a block circuit diagram of another embodiment of my invention applicable to monitoring the thickness of metal sheets.

The embodiment of FIG. 2 is analogous to the embodiment of FIG. 1 adapted to dielectric sheets in the sense that the energy circulates in one direction. The FIG. 2 embodiment however is adapted to monitor the thickness of metallic sheets. Unidirectional energy circulation is advantageous since it places less rigorous requirements on the design of the transmission line components. Specifically, with bidirectional circulation great care must be taken to avoid reflections since they would become part of the signal energy in the loop, jeopardizing system accuracy. With unidirectional energy circulation, well-known microwave technique can be implemented to attenuate or absorb reflections, thereby removing them from the loop.

Referring to FIG. 2, the transmitting and receiving functions of the antennas 4 and 6 of FIG. 1 are performed by separate antennas. Thus RF energy transmitted by antenna 4a bounces off the upper surface of metallic sheet 2 and is received by receiving antenna 4b. Receiving antenna 4b is coupled to a transmitting antenna 6a positioned beneath metallic sheet 2 by transmission lines 68 and 70. An amplifier 66 may be incorporated in the transmission line coupling between antennas 4b and 6a to assist in overcoming loop losses.

The RF energy transmitted by antenna 6a is beamed against the undersurface of sheet 2 and the reflections are intercepted by a receiving antenna 6b. The beam axis of transmitting antennas 4a and 6a are aligned, and thus the energy transmitted thereby impinges on registered, opposing surface portions of the metallic sheet 2. The energy received by antenna 6b is coupled to amplifier 26 and filter 32 and returned to transmitting antenna 4a, completing the loop path.

It is seen from FIG. 2 that variations in the thickness of metallic sheet 2 will result in changes in the electrical length of the energy path from transmitting antenna 4a to receiving antenna 4b, and from transmitting antenna 6a to receiving antenna 6b. Changes in electrical length of the loop path with variations in sheet thickness give rise to changes in the frequency of oscillation which are detected by receiver 60, as in the embodiment of FIG. 1.

As noted, amplifier 66, shown generally in FIG. 2, may be required to insure unity loop gain. Amplifier 66 may take the form of a negative resistance amplifier corresponding to amplifier 26. Alternatively, it may take the form of a conventional microwave amplifier since energy circulation in the loop of FIG. 2 is unidirectional. By the same token, amplifier 26 need not be a negative resistance amplifier.

Figure 3:
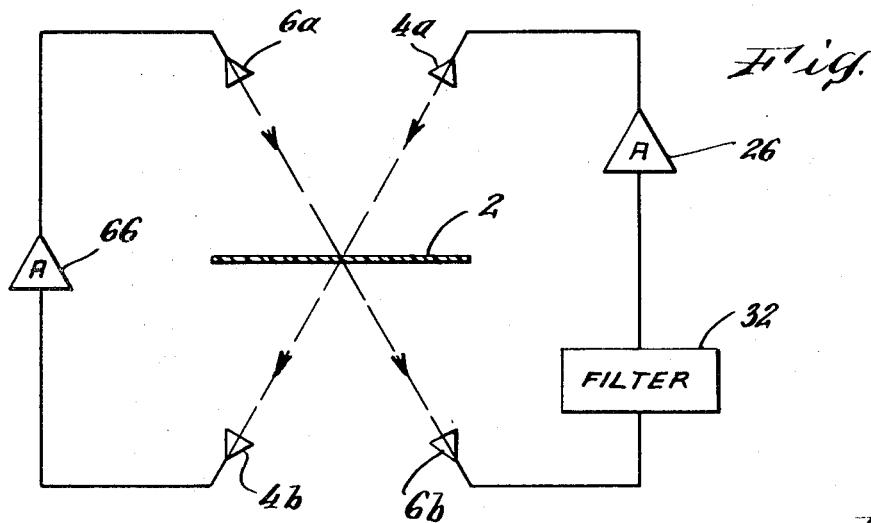
FIG. 3 is a simplified block circuit diagram of a further embodiment of my invention applicable to dielectric sheets.

The embodiment of FIG. 3 is similar to the embodiment of FIG. 2, except that the latter is specifically adapted to monitoring the thickness of dielectric sheets. Basically, the difference between the embodiments of FIGS. 2 and 3 resides in the reversal of the positions of antennas 4b and 6a. Since the sheet 2 is radiotransparent, the receiving antenna 4b paired with transmitting antenna 4a is positioned on the other side of the sheet. Similarly, transmitting antenna 6a and its receiving antenna 6b are on opposite sides of the sheet.

Thus, the energy transmitted by transmitting antenna 4a passes through the sheet and is received by receiving antenna 4b on the other side. This received energy is coupled around to transmitting antenna 6a which is on the same side of the sheet as transmitting antenna 4a. The energy radiated by antenna 6a passes through the sheet and is received by receiving antenna 6b located on the other side of the sheet with antenna 4b. The loop path is completed with the coupling of antennas 6b and 4a together through filer 32 and amplifier 26.

The embodiment of FIG. 3 has several advantages over the embodiment of FIG. 1 adapted to dielectric sheet thickness monitoring. First, the beam axis of the transmitting antenna is not perpendicular to the surface of the sheet. Thus, the possibility of reflected energy returning to the transmitting antenna is minimized. Moreover, the embodiment of FIG. 3 is relatively insensitive to tilting of the sheet 2. Specifically, an increase in the cross section of the sheet through which one beam passes as a result of sheet tilting is compensated by a substantially corresponding decrease in the sheet cross section through which the other beam passes.

For metallic sheets having relatively large lateral dimensions, it may be desired to expand the embodiment of FIG. 2 so as to monitor sheet thickness at two or more laterally spaced locations.

Figure 4:
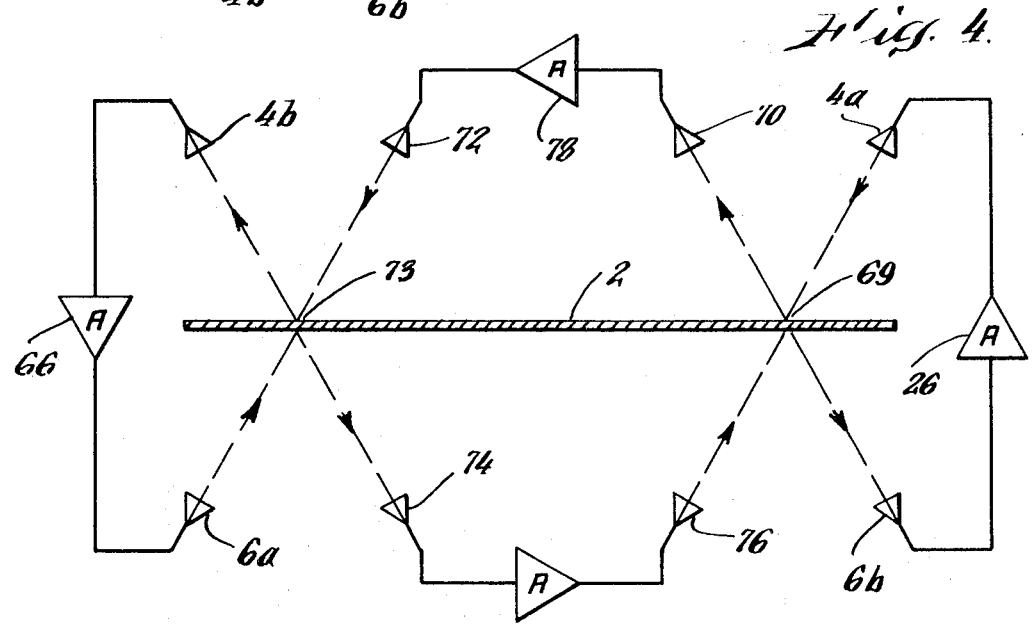
FIG. 4 is a simplified block circuit diagram of still another embodiment of my invention applicable to monitoring the thickness of metallic sheets having large lateral dimensions.

In the embodiment of FIG. 4, an additional pair of transmitting and receiving antennas are fixedly positioned on each side of the metallic sheet. Thus, the energy radiated by transmitting antenna 4a is reflected from the upper surface of the sheet at location 69 and intercepted by receiving antenna 70. This reflected energy is coupled to transmitting antenna 72 through an amplifier 78. The energy radiated by transmitting antenna 72 is reflected from the surface of the sheet at location 73 and intercepted by receiving antenna 4b.

As in the embodiment of FIG. 2, the energy received by antenna 4b is coupled through amplifier 66 to transmitting antenna 6a fixedly positioned on the other side of metallic sheet 2. The energy radiated by transmitting antenna 6a is directed towards the location 73 of the sheet and is reflected by the undersurface thereof. This reflected energy is intercepted by a receiving antenna 74 and is coupled to a transmitting antenna 76 through an amplifier 80. Transmitting antenna 76 directs the energy toward location 69 of the metallic sheet and is reflected to receiving antenna 6b, from which the energy is coupled through amplifier 26 to transmitting antenna 4a, thereby completing the loop path. This loop path would also include a filter (not shown) as in the other embodiments.

It will be appreciated that the operation of the embodiment of FIG. 4 is essentially that of embodiment of FIG. 2. However, the interposition of an additional pair of transmitting and receiving antennas on each side of the sheet permits two laterally spaced cross sections of the metallic sheet to be monitored for thickness. While a plurality of amplifiers are shown included in the loop path of FIG. 4, it will be appreciated that the number of included amplifiers is determined by the amount of loop path losses to be overcome. Again the various amplifiers may be of many forms, however I prefer to employ tunnel diode, negative resistance amplifiers because of their inherently negligible amplitude versus phase distortion characteristic.

Figure 5:
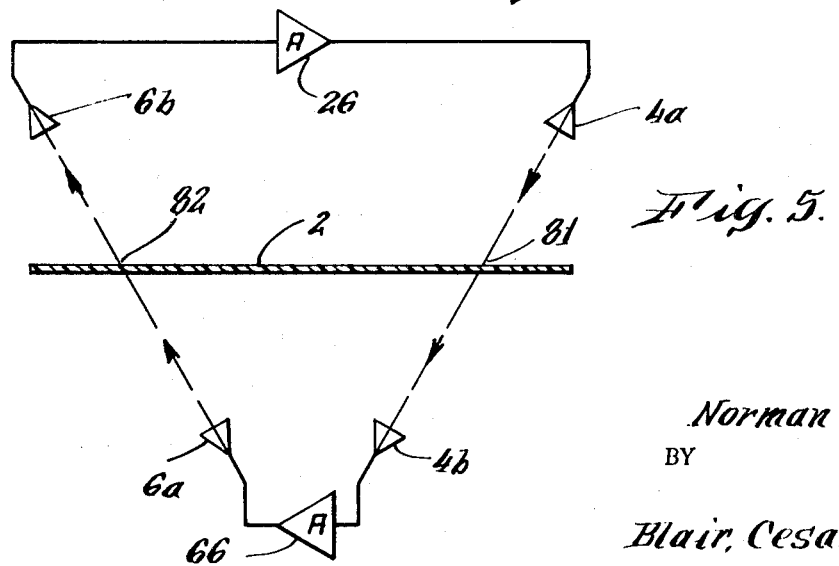
FIG. 5 is a simplified block circuit diagram of an additional embodiment of my invention applicable to dielectric sheets having large lateral dimensions.

The embodiment in FIG. 5 is adapted to monitor dielectric sheet thickness at laterally spaced locations. Thus, the energy radiated by transmitting antenna 4a passes through dielectric sheet 2 at location 81 and is intercepted by receiving antenna 4b. This energy is coupled through amplifier 66 to transmitting antenna 6a and transmitted to receiving antenna 6b, passing through the sheet at location 82. This energy is returned to the transmitting antenna 4a through amplifier 26 and a filter (not shown) thereby completing the loop path.

It will be appreciated that the operation of the embodiment of FIG. 5 for monitoring the thickness of a dielectric sheet at 2 laterally spaced locations corresponds to the operation of embodiment of FIG. 3.

It will be appreciated that may invention is susceptible to further modifications depending upon the application and the accuracy desired. For example, if the position of the metallic sheet 2 relative to one of the antennas of FIG. 1 can be maintained constant, a second antenna is not required. Referring to the drawing, if the bottom surface of the sheet 2 always bears against a fixed reference plane, then the distance between the upper surface of the sheet and the antenna 4 will vary with changes in the thickness dimension. As a result, antenna 6 is no longer needed to reference the position of the bottom surface of the sheet. This being the case, the negative resistance amplifier 26 may be coupled to port 20 of the circulator 10 to establish the loop path without the necessity of transmission lines 18, 24 and circulator 16. The embodiments of FIGS. 2 and 4 are also susceptible to this modification where the transmitting and receiving antennas are all positioned on the same side of the metallic sheet.

In the embodiments of my invention devoted to monitoring the thickness of dielectric sheets, the receiving antenna on the opposite side of the sheet from the transmitting antenna may be replaced by a metal reference plane. The energy is reflected by the plane back through the sheet to the transmitting antenna or a separate receiving antenna. Thus the transmitting and receiving antennas are all located on the same side of the sheet.

It will be appreciated that my invention may be adapted to applications other than thickness monitoring and to objects other than sheets. For example, the principles of my invention may be employed to detect internal flaws in radiotransparent objects such as plastic pipe. The presence of voids and discontinuities produce fluctuations in the receiver DC output which are distinguishable from output variations arising from thickness variations.

Since the spatial position of an energy reflecting surface relative to an energy radiating antenna can be accurately determined by my invention, applications to position and vibration detection and control are contemplated. By maintaining the spacing between antennas or between one antenna and the object under test constant, the antenna(s) may scan a stationary object.

It will be appreciated, that the major portion of the reflected energy returning to the receiving antenna stems from the energy closely centered about the beam axis of the transmitting antenna. The major portion of the energy in the fringes of the antenna radiation patterns is reflected away from the receiving antenna by the sheet surface. Consequently, the thickness measuring sensitivity of the system is somewhat limited to that portion of the sheet passing directly between the antennas, or in front of a single antenna. This, however, is not a significant drawback since by virtue of the manner in which most sheet material is formed, thickness variations typically span the entire width of the sheet. However as disclosed in FIGS. 4 and 5, additional flanking antennas may be incorporated for concurrently monitoring the thickness dimensions of the sheet at several locations. The embodiments of FIGS. 4 and 5 may be expanded to monitor sheet thickness at any number of laterally spaced locations. In this connection, the antennas may be adapted with suitable lenses to equalize the phase fronts of the energy reflected from the sheet surfaces.

While the antennas used in my invention are preferably designed to have low side lobes so that their radiation transmission and response characteristics are largely directional, it is contemplated that radiation absorptive elements may be strategically positioned relative to the antennas to absorb stray radiation.

It will thus be seen that the objects set forth above, among those made apparent from the preceding description are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A system for monitoring a characteristic of an object, said system comprising, in combination:
  A. a microwave amplifier,
  B. microwave energy transmitting and receiving means positioned relative to the object,
    1. said means transmitting electromagnetic energy for impingement on a surface of the object and receiving said surface impinging energy,
  C. means coupling said transmitted and surface impinging energy in a loop path including said amplifier and said transmitting and receiving means for oscillatory operation of said amplifier,
    1. said loop path having an electrical length varying in accordance with variations in the object's characteristic to be monitored, 2. the oscillation frequency of the energy propagating in said loop path being dependent upon the instantaneous electrical length thereof, and D. means coupled with said loop path for monitoring the frequency of the energy propagating therein and providing a characteristic indicative signal output.

2. The system defined in claim 1 wherein:
  1. said microwave amplifier includes a negative resistance device as an active element.

3. The system defined in claim 2 wherein:
  1. said negative resistance device comprises a tunnel diode.

4. The system defined in claim 1 wherein:
  1. said coupling means includes a phase filter, said filter
    a. defining the frequency band in which oscillatory operation may occur, and
    b. establishing a desired oscillatory frequency shift versus electrical loop path length variation.

5. The system as defined in claim 1 wherein:
  1. said monitoring means comprises a superheterodyne FM receiver.

6. A system for measuring the thickness of sheet material, said system comprising in combination:
A. a microwave amplifier,
B. first and second microwave antennas positioned in spaced relation with the sheet passing therebetween,
  1. said antennas radiating electromagnetic energy for impingement on opposing surfaces of the sheet and receiving energy reflected therefrom,
C. transmission line coupling said antennas and said amplifier in a recirculatory loop path for oscillatory operation of said amplifier,
  1. said loop path having an electrical length varying in accordance with the thickness of the sheet, and
  2. the oscillation frequency of the energy in said loop path being dependent upon the instantaneous electrical length thereof; and
D. means coupled with said transmission line for monitoring the frequency of the energy transmitted therein and providing a signal output indicative of the sheet thickness.

7. A system for monitoring the thickness of electromagnetic energy reflective sheet material, said system comprising in combination:
A. at least one microwave amplifier,
B. a pair of microwave antennas stationed on each side of the sheet in spaced relation to opposing surfaces thereof, one of the antennas of each pair being a transmitting antenna and the other a receiving antenna,
  1. said transmitting antennas radiating electromagnetic energy for impingement on opposing surfaces of the sheet at registered locations and said receiving antennas receiving energy reflected therefrom,
C. transmission line coupling said antennas and said amplifier in a loop path for oscillatory operation of said amplifier,
  1. said loop path having an electrical length varying in accordance with the thickness of the sheet and
  2. the oscillation frequency of the energy in said loop path being dependent upon the instantaneous electrical length thereof, and
D. means coupled with such transmission lines for monitoring the frequency of the energy propagating therein and providing a signal output indicative of the sheet thickness.

8. The system defined in claim 7 wherein:
  1. said transmission line couples said receiving antennas on one side of the sheet to the transmitting antennas on the other side of the sheet.

9. The system defined in claim 7 wherein:
  1. said amplifier comprises a negative resistance, tunnel diode amplifier.

10. The system defined in claim 7 wherein:
  1. said monitoring means comprises a superheterodyne FM receiver.

11. A system as defined in claim 7 which further includes:
E. a loop phase filter included in said loop path, said filter,
  1. defining the frequency band in which oscillatory operation may occur, and
  2. establishing a desired oscillatory frequency shift versus electrical loop path length variation.

12. The system defined in claim 11 wherein said system further includes:
F. first and second circulators having respectively first, second and third ports,
  1. said first port of said first circulator coupled by a first segment of said transmission line to said transmitting antenna of one pair,
  2. said first port of said second circulator coupled to said receiving antenna of the other pair by a second segment of said transmission line,
  3. said second port of said first circulator coupled to said loop phase filter by a third segment of said transmission line,
  4. said second port of said second circulator coupled to said amplifier through a fourth segment of said transmission line,
  5. said third ports of said first and second circulators being coupled together by a fifth segment of said transmission line, and
  6. the remaining transmitting and receiving antennas of the pairs coupled together by a sixth transmission line segment.

13. The system defined in claim 12 wherein said loop phase filter comprises:
  1. a resistive element terminating said third transmission line segment in its characteristic impedance,
  2. a quarter wave stub adjustably coupled into said third transmission line segment ahead of said resistive element.

14. The system defined in claim 7 which further includes:
  1. at least one additional pair of intercoupled transmitting and receiving antennas stationed on each side of the sheet,
    a. said additional pairs of antennas being included in said loop path and positioned relative to said other antennas so as to concurrently monitor the sheet thickness at spaced locations.

15. A system for monitoring a characteristic of a radiotransparent object, said system comprising, in combination:
A. at least one microwave amplifier,
B. first and second microwave transmitting antennas and first and second receiving antennas positioned relative to the object,
  1. said first transmitting antenna directing a first beam of electromagnetic energy through the object for reception by said first receiving antenna while said second transmitting antenna directs a second beam of electromagnetic energy through the object for reception by said second receiving antenna,
C. transmission line coupling said antennas and said amplifier in a loop path for oscillatory operation of said amplifier,
  1. said loop path having an electrical length dependent upon the characteristic of the object being monitored, and
  2. the oscillation frequency of the energy in said loop path being dependent upon the instantaneous electrical length thereof, and
D. means coupled with said transmission line for monitoring the frequency of the energy propagating therein and providing a characteristic indicative signal output.

16. The system defined in claim 15 wherein:
  1. said amplifier is a negative resistance tunnel diode amplifier.

17. The system defined in claim 15 wherein:
  1. said transmission line couples said first receiving antenna to said second transmitting antenna and said second receiving antenna to said first transmitting antenna.

18. The system defined in claim 17 wherein:
  1. said first and second transmitting antennas are positioned on one side of the object and said first and second receiving antennas are positioned on the other side thereof, 2. said first and second beams intersecting substantially during passage through the object.
19. The system defined in claim 17 wherein:
1. said first and second transmitting antennas are positioned on opposite sides of the object,
2. said beams passing through object at spaced locations.

* * * * *